United States Patent [19]

Neeff et al.

[11] Patent Number: 4,628,093
[45] Date of Patent: Dec. 9, 1986

[54] RED NICKEL AZINE PIGMENT

[75] Inventors: Rütger Neeff; Meinhard Rolf; Walter Müller, all of Leverkusen, Fed. Rep. of Germany

[73] Assignee: Bayer Aktiengesellschaft, Leverkusen, Fed. Rep. of Germany

[21] Appl. No.: 663,781

[22] Filed: Oct. 23, 1984

[30] Foreign Application Priority Data

Oct. 25, 1983 [DE] Fed. Rep. of Germany ....... 3338622

[51] Int. Cl.⁴ .................... C07D 401/12; C08K 5/34; C09B 57/04
[52] U.S. Cl. ........................ 546/6; 524/103; 546/272; 546/288
[58] Field of Search .............................. 546/6

[56] References Cited

U.S. PATENT DOCUMENTS 4,111,947  9/1978  L'Eplattenier ........................ 546/6
4,496,727  1/1985  Iqbal ..................................... 546/6

FOREIGN PATENT DOCUMENTS 74924  3/1983  European Pat. Off. ................ 546/6

Primary Examiner—Mark L. Berch
Attorney, Agent, or Firm—Sprung, Horn, Kramer & Woods

[57] ABSTRACT

Red pigment of the formula

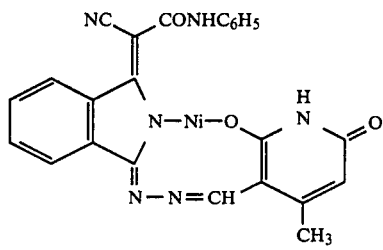

a process for its preparation and its use.

3 Claims, 1 Drawing Figure

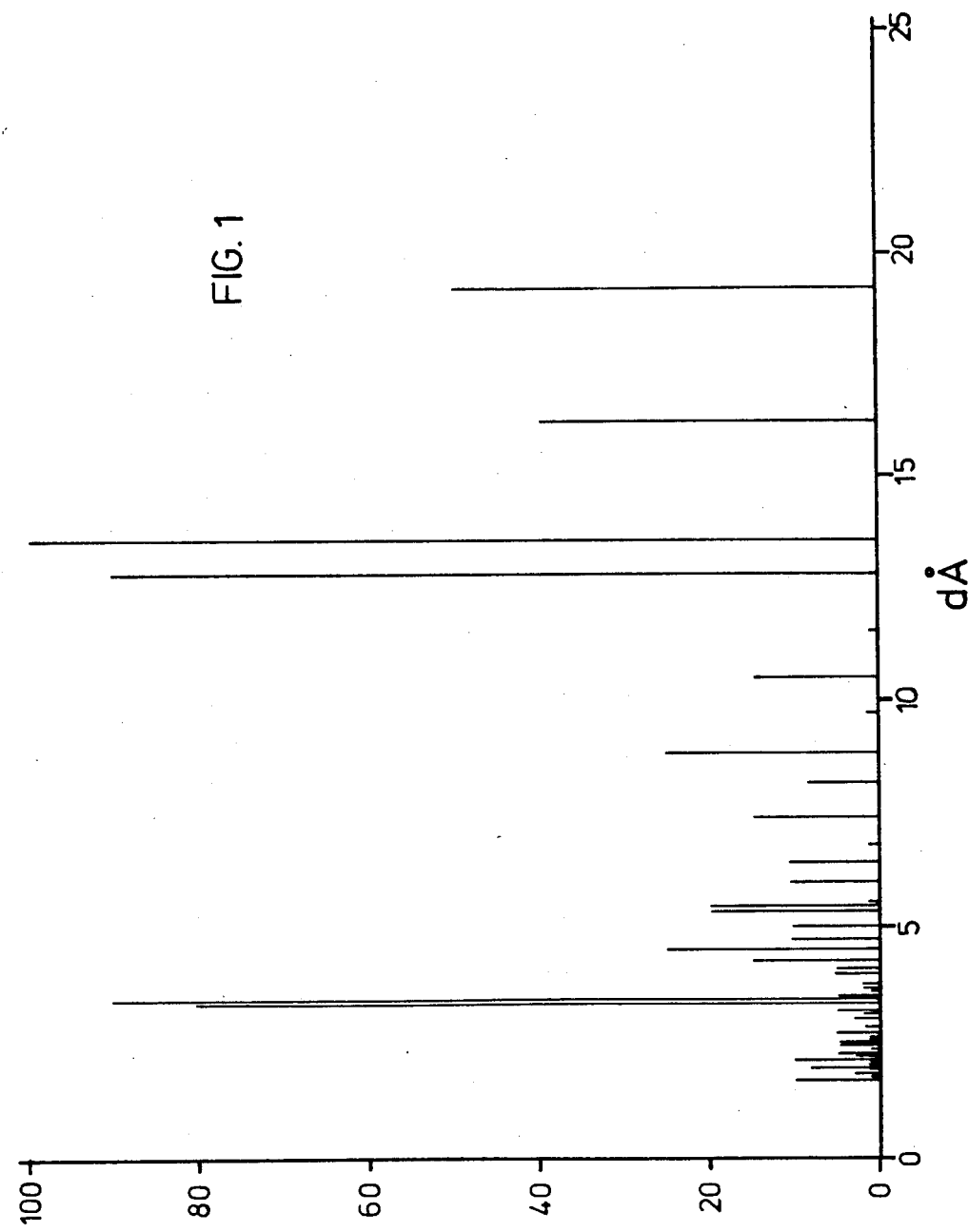

RED NICKEL AZINE PIGMENT

The invention relates to a new red pigment which, in one of its possible tautomeric forms, corresponds to the formula (I)

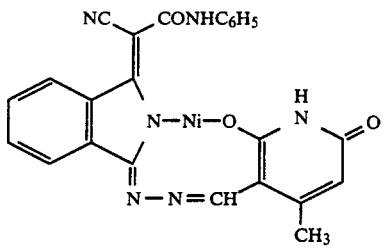

a process for its preparation and its use.

The new pigment is furthermore characterised by interplanar spacings d/Å of 13.46; 12.75; 3.37 and 19.99 with relative intensities of 100, 90, 90 and 50.

The interplanar spacings given are calculated from the four most intense lines in the DEBYE-SCHERRER diagram attached as FIG. 1 (wavelength 1.54 Å of the Cu-K radiation).

The new pigment can preferably be characterised by the standard colour values (DIN 5033) X=23.35, Y=14.19 and Z=5.08 and a coloured shade angle of 31.3°. It has a red colour shade, which approximately corresponds to indicator number 8 according to the Colour Index Hue Indication Chart.

Several processes are available for the preparation of the red pigment of the formula (I):

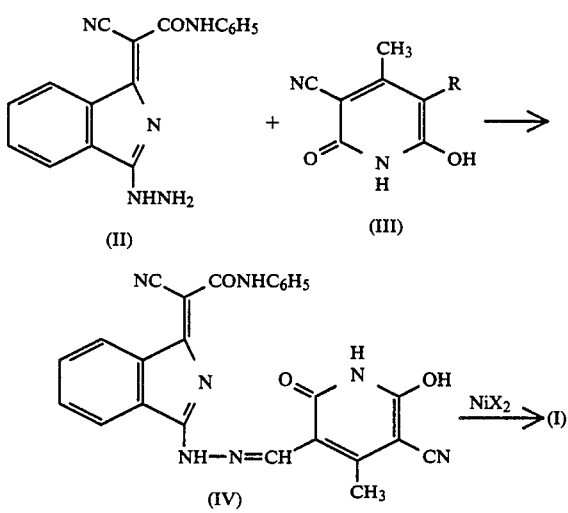

The hydrazone (II) is subjected to a condensation reaction with the aldehyde or an optionally substituted aldehyde-anil of 2,6-dihydroxy-4-methyl-3-cyanopyridine (III, R=CHO or CHN-Ar, Ar designating an optionally substituted phenyl radical) to give the azine (IV), which is then reacted with a nickel salt to give the red pigment (I). The reaction of (II) with (III) is advantageously carried out in an organic solvent at temperatures between 60° and 150° C., if appropriate under pressure. Possible organic solvents are alcohols, such as methanol, ethanol, n-butanol, ethylene glycol, ethylene glycol monomethyl ether, ethylene glycol monoethyl ether or benzyl alcohol; aromatics, such as toluene, xylene, chlorobenzene, 1,2-dichlorobenzene and nitrobenzene, or pyridine or aprotic solvents, such as dimethylformamide, N-methylpyrrolidone, dimethylacetamide, dimethylsulphoxide or tetramethylenesulphone.

Possible substituents of the aniline part of the aldehyde-anil (III) are halogen, such as chlorine and bromine, alkyl, in particular $C_1$-$C_4$-alkyl, preferably methyl, alkoxy, in particular $C_1$-$C_4$-alkoxy, preferably methoxy, and nitro. The aniline part of the aldehyde-anil is preferably unsubstituted; it can also carry, for example, 1 or 2 substituents. For the subsequent metallisation, (IV) can be isolated and advantageously reacted with a nickel salt in one of the abovementioned solvents from the group of alcohols or of aprotic solvents, at temperatures of 60°–150° C. The nickel salts which can be used are the acetate, formate, carbonate, sulphate, chloride or nitrate.

As a modification of this process, the isolation of (IV) can be dispensed with and the metallisation can subsequently be carried out directly.

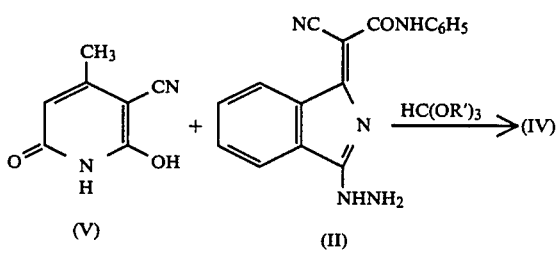

There is also the possibility of subjecting 2,6-dihydroxy-4-methyl-3-cyanopyridine (V) to a condensation reaction with (II) and an orthoformate (R'=CH$_3$ or C$_2$H$_5$) to give the azine (IV). This condensation reaction is carried out in one of the abovementioned solvents at temperatures between 60° and 150° C., advantageously with azeotropic removal of the alcohol R'OH formed. In this process variant also, (IV) can be isolated and metallised as described above, or the metallisation is subsequently carried out directly in the same solvent.

Finally, the preparation of the aldehyde-anil (III, R=CHNAr) can be incorporated in the synthesis and the pyridone (V) and optionally substituted aniline can be subjected to a condensation reaction with an orthoformate (HC(OR')$_3$; R'=CH$_3$ or C$_2$H$_5$) in a prior step. The hydrazone (II) is then added and the components are reacted as described above to give the red pigment. The reaction of the pyridone can be carried out in one of the abovementioned solvents, also at temperatures of 60°–150° C.

In the processes described above, the red pigment (I) is in general obtained in an adequate purity and can be used as a pigment directly or after suitable finishing. However, there is the possibility of carrying out after-purification by after-treatment in a solvent, if appropriate at elevated temperatures.

However, care should be taken that the pigment (I) is not heated to temperatures above 160°–170° C., since it is otherwise obtained in an orange-coloured modification. This orange-coloured modification is known from European Patent No. A1-74,924.

A new process for the preparation of an orange-coloured pigment of the formula (I) thus consists of a procedure in which the red pigment of the formula (I) is heated to temperatures above 160° C. for 15 minutes to 5 hours, if appropriate in a diluent, such as dimethylformamide, nitrobenzene or dichlorobenzene, and if appropriate under pressure.

On the basis of its good pigment properties, the pigment of the formula (I) is suitable for the most diverse pigment applications. Thus, it can be used for the preparation of very fast pigmented systems, such as for mixing with other substances, formulations, paints, printing inks, dyed paper and dyed macromolecular substances. Mixing with other substances can be understood, for example, as mixing with inorganic white pigments, such as titanium dioxide (rutile). Examples of formulations are flush pastes with organic liquids and, if appropriate, preservatives. The term paints represents, for example, lacquers which dry physically or by oxidation, stoving lacquers, reactive lacquers, two-component lacquers, emulsion paints for weatherproof coatings and distempers. Printing inks are to be understood as those for printing paper, textiles and tinplate. The new red pigment is particularly suitable for pigmenting macromolecular organic substances.

The macromolecular substances can be of natural origin, such as rubber, or can be obtained by chemical modification, such as acetylcellulose, cellulose butyrate or viscose, or synthetically produced, such as polymers, polyaddition products and polycondensates. Examples which may be mentioned are plastic materials, such as polyvinyl chloride, polyvinyl acetate, polyvinyl propionate, polyolefins, for example polyethylene, or polyamides, high molecular weight polyamides, polymers and copolymers of acrylates or methacrylates, acrylonitrile, acrylamide, butadiene and styrene, and polyurethanes and polycarbonates. The substances pigmented with the product claimed can be in any desired form. Because of its high transparency and fastness to weathering, the pigment of the formula (I) is particularly suitable for use in automobile lacquers, especially for metallic lacquerings.

The pigment of the formula (I) is outstandingly fast to water, oil, acid, lime, alkali, solvents, overlacquering, overspraying and sublimation, resistant to heat and resistant to vulcanisation, has a high tinctorial strength, is easily disposable in plastic materials and is particularly outstandingly fast to light and migration.

EXAMPLE 1

26.16 g of 1-(cyanophenylcarbamylmethylene)-3-hydrazonoisoindolenine and 21.76 g of 2,6-dihydroxy-4-methyl-5-cyanopyridine-3-aldehyde-anil are stirred in 280 ml of dimethylformamide at 100° C. for 1 hour, and 22.56 g of nickel acetate. 4 $H_2O$ are then added in the course of 15 minutes. The mixture is subsequently stirred at 120° C. for 3 hours and the product, which has crystallised in attractive red needles, is filtered off with suction at 80° C. and washed with methanol to give, after drying, 41.2 g=91.8% of theory of the scarlet red pigment of the formula (I).

$C_{25}H_{15}N_7O_3Ni$ (519.7),
Calculated: C 57.73; H 2.89 ; N 18.86; 09.24; Ni 11.29.
Found: C 59.90; H 3.25; N 18.70; 09.40; Ni 11.30.

The X-ray diffraction diagram according to DE8YE-SCHERRER is characterised by the interplanar spacings d Å of 13.46, 12.75, 3.37 and 19.99 (intensities of 100, 90, 90 and 50). The complete spectrum is shown in FIG. 1.

EXAMPLE 2

6.54 g of 1-(cyanophenylcarbamylmethylene)-3-hydrazonoisoindolenine and 3.84 g of 2,6-dihydroxy-4-methyl-5-cyanopyridine-3-aldehyde are stirred in 70 ml of dimethylformamide at 100° C. for 1 hour, and 5.64 g of nickel acetate. 4 $H_2O$ are then added. The mixture is stirred at 120° C. for a further 3 hours and the product, which has crystallised in attractive red needles, is filtered off with suction at 80° C. and washed with methanol to give, after drying, 9.8 g=87.3% of theory of the scarlet red pigment of the formula (1).

EXAMPLE 3

3.25 g of 2,6-dihydroxy-4-methyl-5-cyanopyridine, 2.6 g of trimethyl orthoformate and 2.52 g of aniline are stirred in 75 ml of dimethylformamide at 120°–125° C. for 1 hour, and 6.54 g of 1-(cyanophenylcarbamylmethylene)-5-hydrazonoisoindolenine are added at 100° C. The mixture is stirred at 100° C. for a further hour, 5.64 g of nickel acetate . 4 $H_2O$ are introduced, the mixture is warmed at 120° C. for 3 hours and the product, which has crystallised as attractive red needles, is filtered off with suction at 80° C. and washed with methanol to give, after drying, 9.2 g=81.7% of theory of the scarlet red pigment of the formula (I).

EXAMPLE 4

5 g of 1-(cyanophenylcarbamylmethylene)-3-hydrazonoisoindolenine, 2.1 g of trimethyl orthoformate and 2.5 g of 2,6-dihydroxy-4-methyl-5-cyanopyridine are warmed to 120°–125° C. in 50 ml of dimethylformamide in the course of 1 hour and the mixture is stirred at 120°–125° C. for 3 hours. 2.82 g of nickel acetate . 4 $H_2O$ are then added, the mixture is stirred at 120° C. for 3 hours and the product, which has crystallised in attractive red needles, is filtered off with suction at 80° C. and washed with methanol to give, after drying, 7.1 g=82.8% of theory of the scarlet red pigment of the formula (I).

EXAMPLE 5

5 g of 1-(cyanophenylcarbamylmethylene)-3-hydrazonoisoindolenine, 2.1 g of trimethyl orthoformate and 2.5 g of 2,6-dihydroxy-4-methyl-5-cyanopyridine are warmed to 140°–145° C. in 50 ml of nitrobenzene in the course of 1 hour and the mixture is stirred at 140°–145° C. for 4 hours. The product, which has crystallised in small yellow-brown needles, is filtered off with suction at 80° C. and washed with methanol to give, after drying, 7 g=91.6% of theory of the azine of the formula

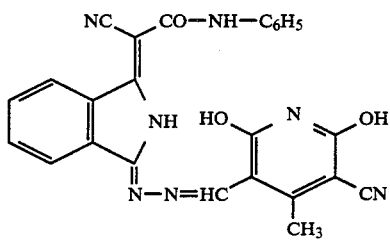

5 g of the abovementioned azine are warmed to 120° C. with 2.82 g of nickel acetate . 4 $H_2O$ in 50 ml of dimethylformamide in the course of 1 hour and the mixture is stirred at this temperature for 3 hours. The product, which has crystallised in attractive red needles, is filtered off with suction at 80° C. and washed with methanol to give, after drying, 5.2 g=92.7% of theory of the scarlet red pigment of the formula (I).

EXAMPLE 6 (USE EXAMPLE)

4 g of finely ground pigment according to Example 1 are dispersed in 92 g of a stoving lacquer having the following composition: 33% of alkyd resin, 15% of melamine resin, 5% of glycol monomethyl ether, 34% of xylene and 13% of butanol.

Possible alkyd resins are products based on synthetic and vegetable fatty acids, such as coconut oil, castor oil, hydrogenated castor oil, linseed oil and the like. Instead of melamine resins, it is also possible to use urea resins.

After dispersion has been effected, the pigmented lacquer is applied to sheets of paper, glass, plastic or metal and is stoved at 130° C. for 30 minutes. The lacquerings have very good resistance to light and weathering and good fastness to overlacquering.

A stoving lacquer prepared according to Example 6 is brushed onto white paper and stoved at 130° C. Colorimetric evaluation according to DIN 5033 gives the standard colour values of X=23.35, Y=14.19 and Z=5.08 and a coloured shade angle of 31.3°.

EXAMPLE 7 (USE EXAMPLE)

6 parts of pigment according to Example 1 are dispersed in 12 parts of xylene, 4.1 parts of butylacetate and 0.7 part of n-butanol with 22.5 parts of a 20% strength solution of cellulose acetobutyrate in butylacetate/xylene (2:1) in a Red Devil using 2-3 mm glass beads for 30 minutes. After oiling by addition of 10 parts of a saturated polyester resin (Dynapol H 700), 7.3. parts of melamine resin, 8.7 parts of a 20% strength solution of cellulose acetobutyrate in butylacetate/xylene (2:1), 18 parts of butylacetate, 1.6 parts of n-butanol and 9.7 parts of xylene, the dispersing operation is carried out for a further 5 minutes.

A dispersion of aluminium paste (60%) in an organic solvent (about 1:2) is added to this lacquer in an amount such that the ratio of pigment:Al is between 80:20 and 1:99.

This lacquer is brushed on and, after drying, is covered with a clear lacquer which is based on acrylate/melamine resin and can contain other auxiliaries, such as, for example, UV absorbers, and the lacquers are stoved.

A red metallic lacquering with a brilliant colour shade and excellent fastness to weathering is obtained.

We claim:

1. Red pigment which, in one of its tautomeric forms, corresponds to the formula

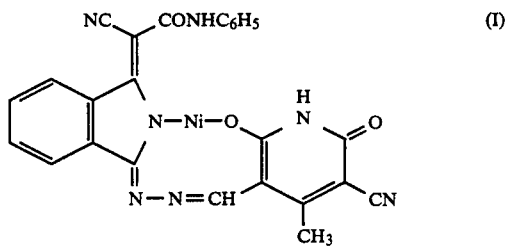

2. Red pigment according to claim 1, characterised by interplanar spacings d/Å of 13.46; 12.75; 3.37 and 19.99 with relative intensities of 100, 90, 90 and 50.

3. Pigment according to claim 1, characterised by the standard colour values (according to DIN 5033) of X=23.35, Y=14.19 and Z=5.08 and a coloured shade angle of 31.3°.

* * * * *

UNITED STATES PATENT AND TRADEMARK OFFICE
CERTIFICATE OF CORRECTION

PATENT NO. : 4,628,093
DATED : December 9, 1986
INVENTOR(S) : Rütger Neeff, et al.

It is certified that error appears in the above-identified patent and that said Letters Patent is hereby corrected as shown below:

Abstract, line 2 and Col. 1, line 14

End of formula insert -- \CN-- as follows:

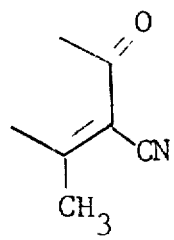

Signed and Sealed this

Eleventh Day of August, 1987

Attest:

DONALD J. QUIGG

Attesting Officer

Commissioner of Patents and Trademarks